(12) United States Patent
Moribe et al.

(10) Patent No.: US 8,783,843 B2
(45) Date of Patent: Jul. 22, 2014

(54) SET OF INK AND REACTION LIQUID, AND IMAGE FORMING METHOD

(75) Inventors: Kenji Moribe, Fujisawa (JP); Yasuhito Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 13/440,342

(22) Filed: Apr. 5, 2012

(65) Prior Publication Data

US 2012/0268521 A1 Oct. 25, 2012

(30) Foreign Application Priority Data

Apr. 19, 2011 (JP) ................................ 2011-093347
Mar. 29, 2012 (JP) ................................ 2012-076527

(51) Int. Cl.
*B41J 2/01* (2006.01)
*C09D 11/00* (2014.01)
*B41J 2/21* (2006.01)

(52) U.S. Cl.
CPC . *C09D 11/54* (2013.01); *B41J 2/01* (2013.01); *B41J 2/2107* (2013.01); *C09D 11/322* (2013.01)
USPC ........................................... 347/100; 347/96

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC ........... 347/100, 95, 96, 88, 99, 102, 101, 21, 347/20; 106/31.13, 31.6, 31.27; 523/160, 523/161
See application file for complete search history.

(56) References Cited

U.S. PATENT DOCUMENTS

| 6,932,465 | B2 | 8/2005 | Nito et al. |
| 7,354,145 | B2 | 4/2008 | Nito et al. |
| 7,682,433 | B2 | 3/2010 | Yanagimachi et al. |
| 7,699,924 | B2 | 4/2010 | Mafune et al. |
| 7,862,653 | B2 | 1/2011 | Sanada et al. |
| 7,878,643 | B2 | 2/2011 | Kudo et al. |
| 7,947,762 | B2 | 5/2011 | Udagawa et al. |
| 7,988,277 | B2 | 8/2011 | Moribe et al. |
| 8,016,932 | B2 | 9/2011 | Okamura et al. |
| 8,217,097 | B2 | 7/2012 | Udagawa et al. |
| 2004/0104986 | A1* | 6/2004 | Nito et al. ........................ 347/96 |
| 2004/0201658 | A1* | 10/2004 | Jackson et al. ................ 347/100 |
| 2005/0219341 | A1 | 10/2005 | Nito et al. |
| 2006/0023044 | A1* | 2/2006 | Bauer ........................... 347/100 |
| 2006/0092251 | A1* | 5/2006 | Prasad et al. .................. 347/100 |
| 2006/0283798 | A1 | 12/2006 | Ueki et al. |
| 2007/0097155 | A1 | 5/2007 | Imai et al. |
| 2007/0112095 | A1 | 5/2007 | Moribe et al. |
| 2007/0229636 | A1* | 10/2007 | Mubarekyan et al. ........ 347/100 |
| 2008/0257203 | A1* | 10/2008 | Choy et al. .................. 106/31.13 |
| 2009/0295893 | A1* | 12/2009 | Akiyama et al. ................ 347/96 |
| 2011/0102497 | A1 | 5/2011 | Sato et al. |
| 2011/0141190 | A1 | 6/2011 | Moribe et al. |

FOREIGN PATENT DOCUMENTS

| CN | 1493465 A | 5/2004 |
| EP | 1 400 364 A1 | 3/2004 |
| EP | 2 233 634 A1 | 9/2010 |
| JP | 2008-155520 A | 7/2008 |
| JP | 2008-308663 A | 12/2008 |

OTHER PUBLICATIONS

Oct. 30, 2012, European Communication in European Patent Appln. No. 12002474.0.
Dec. 20, 2013 Chinese Office Action in Chinese Patent Application No. 201210116938.0.

* cited by examiner

*Primary Examiner* — Manish S Shah
(74) *Attorney, Agent, or Firm* — Fitzpatrick, Cella, Harper & Scinto

(57) ABSTRACT

A set of an ink containing a pigment dispersed by a water-soluble resin and having the surface tension of 38 mN/m or less and a reaction liquid containing a polyvalent metal ion and a surfactant, which is an ethylene oxide adduct of a higher alcohol of a linear primary or secondary alcohol or an isoalkyl alcohol, and has a HLB value of 13.0 or more as determined by the Griffin method. The content of the polyvalent metal ion in the reaction liquid is 10.0 times or more in terms of molar ratio as much as an amount of an acidic group derived from the water-soluble resin in the ink and the content of the surfactant in the reaction liquid is 0.15 times or more in terms of mass ratio as much as the total content of the pigment and water-soluble resin in the ink.

9 Claims, No Drawings

SET OF INK AND REACTION LIQUID, AND IMAGE FORMING METHOD

BACKGROUND OF THE INVENTION

1. Field of the Invention

The present invention relates to a set of an ink and a reaction liquid, and an image forming method.

2. Description of the Related Art

In recent years, an ink jet recording method has been required to achieve both adaptation to high speed recording and acquisition of an excellent optical density on a recording medium, in particular, plain paper, at a high level. In order to meet this requirement, in the ink jet recording method, there has been variously proposed a process in which a liquid for making an image good is provided as what is called a reaction liquid separately from an ink containing a coloring material, and the reaction liquid and the ink are applied to a recording medium to form an image.

For example, there has been a proposal for controlling an ink and a reaction liquid so as to slow the speeds of penetration and diffusion thereof into a recording medium, not by improving the reactivity between them, thereby achieving a high optical density (see Japanese Patent Application Laid-Open No. 2008-308663). Specifically, a reaction liquid whose dynamic surface tension at a lifetime of 30 milliseconds is 41 mN/m or more and an ink whose static surface tension is high to some extent are used, thereby ensuring a time period during which a coloring material aggregates on the surface of the recording medium to improve the optical density. On the other hand, in order to solve a problem of clogging caused by an aggregate produced by a reaction in an absorber within a cap protecting a recording head or in a waste liquid absorber of a recording apparatus, there has been a proposal for inhibiting a reaction at a position where it is not wanted to cause the reaction (see Japanese Patent Application Laid-Open No. 2008-155520). Specifically, it has been proposed to provide an ink containing a reaction inhibitor for inhibiting such a reaction separately from the reaction liquid and the ink.

SUMMARY OF THE INVENTION

However, according to the technique proposed by Japanese Patent Application Laid-Open No. 2008-308663, it takes a long time to dry the ink because the penetration and diffusion of the ink into the recording medium are inhibited, so that the fixability of an image required to adapt to high speed recording is not achieved. That is, the ink of a first recorded article is not sufficiently dried between completion of printing of a first recording object and discharge of a second printed article from an ink jet recording apparatus, so that the ink of the first recorded article adheres to a back surface of the second recorded article. In Japanese Patent Application Laid-Open No. 2008-308663, the dynamic surface tension of the reaction liquid at a lifetime of 500 milliseconds is controlled to 38 mN/m or less. However, it has not been achieved to adapt to high speed recording of the level required in recent years, which the present invention intends to achieve.

In order to achieve an excellent optical density while satisfying the fixability of an image for adapting to high speed recording, it is yet effective from the above to improve the reactivity between a reaction liquid and an ink. Specifically, it is important to fix a coloring material to a recording medium before the ink penetrates and diffuses by enhancing the cohesiveness of the coloring material on the recording medium.

However, when the reaction liquid is applied to the recording medium from a recording head of an ink jet system in the method of forming an image by applying the reaction liquid and the ink to the recording medium as described above, there is a possibility of causing the following problem. That is, when rebounding of a droplet occurs when the reaction liquid or the ink is applied to the recording medium, the reaction liquid is mixed with the ink at a surface where an ejection orifice has been formed in the recording head (hereinafter referred to as an ejection orifice surface), and the rebounding of the droplet is received. When the reactivity between the reaction liquid and the ink is enhanced as described above, the reaction liquid and the ink that have been mixed at the ejection orifice surface of the recording head come to strongly react to each other. As a result, an unremovable firm sticking matter comes to occur on the ejection orifice surface even when a suction recovery operation generally adopted in the ink jet recording apparatus for keeping the ejection orifice surface of the recording head clean is conducted.

When the ink containing the reaction inhibitor described in Japanese Patent Application Laid-Open No. 2008-155520 is utilized, a certain effect is achieved on sticking suppression on the ejection orifice surface. However, in this method, it is necessary to provide another ink that is hard to react to the reaction liquid, i.e., does not contribute to the object of achieving the high optical density for suppressing the sticking. In addition, such an ink needs to be consumed only for suppressing the sticking independently of the primary object of ink of forming an image. As a result, the kind of the ink used and the amount of the ink consumed come to be increased.

Accordingly, it is an object of the present invention to provide a set of an ink and a reaction liquid, by which sticking on an ejection orifice surface of a recording head can be suppressed while achieving both excellent fixability of an image for adapting to high speed recording and acquisition of an excellent optical density at a high level. Another object of the present invention is to provide an image forming method that can adapt to high speed recording, obtain the above-described excellent image and suppress sticking on an ejection orifice surface of a recording head.

The above objects can be achieved by the present invention described below. That is, the present invention provides a set of an ink and a reaction liquid for ink jet, the set having a combination of an ink containing a pigment dispersed by a water-soluble resin and a reaction liquid containing no coloring material but containing a polyvalent metal ion and a surfactant, wherein a surface tension of the ink is 38 mN/m or less, a content ($\mu$mol/g) of the polyvalent metal ion in the reaction liquid is 10.0 times or more in terms of molar ratio as much as an amount ($\mu$mol/g) of an acidic group derived from the water-soluble resin in the ink, the surfactant in the reaction liquid contains an ethylene oxide adduct of a higher alcohol selected from the group consisting of a linear primary alcohol, a linear secondary alcohol and an isoalkyl alcohol, and has a HLB value of 13.0 or more as determined by the Griffin method, and a content (% by mass) of the surfactant in the reaction liquid is 0.15 times or more in terms of mass ratio as much as the total content (% by mass) of the pigment and the water-soluble resin in the ink.

According to the present invention, there can be provide a set that can suppress sticking on an ejection orifice surface of a recording head while achieving both excellent fixability of an image for adapting to high speed recording and acquisition of an excellent optical density at a high level. According to the present invention, there can also be provided an image forming method that can adapt to high speed recording, obtain the above-described excellent image and suppress sticking on an ejection orifice surface of a recording head.

Further features of the present invention will become apparent from the following description of exemplary embodiments.

DESCRIPTION OF THE EMBODIMENTS

Preferred embodiments of the present invention will now be described in detail. Incidentally, various physical properties such as viscosity, surface tension, pH and pKa in the present invention are values at 25° C. In addition, "pKa" defined in the present invention is an index for quantitatively indicating the strength of an acid and is also called an acid dissociation constant or an acidity constant. It is represented by a negative common logarithm pKa in view of dissociation reactions to release hydrogen ions from acids. Accordingly, the smaller pKa indicates that such an acid is stronger.

First, methods for achieving excellent optical density on a recording medium, in particular, plain paper, among the objects of the present invention include a method of slowing the speeds of penetration and diffusion of an ink into a recording medium as described above. However, this method is hard to adapt to high speed recording because a time required for drying of the ink becomes long, and so the fixability of an image is lowered. Thus, the present inventors have considered that it is useful to cause ink to have some penetrability and then enhance the reactivity between a reaction liquid and the ink for achieving both excellent fixability of an image for adapting to high speed recording and acquisition of excellent optical density at a high level, and a method for it has been investigated.

In that case, it is necessary to newly establish a technique for suppressing the sticking on the ejection orifice surface of a recording head among the objects of the present invention. Thus, the present inventors have investigated what substance is useful as a substance for markedly lowering the reactivity between the reaction liquid and the ink, i.e., a reaction inhibitor. Specifically, various water-soluble organic solvents and surfactants have been combined with various pigments, resin dispersants and reaction agents to investigate the reactivities thereof, thereby finding a substance effectively functioning as a reaction inhibitor in some combinations.

Specifically, the following has been found. In a system excluding a reaction inhibitor, i.e., a combination of a pigment and a resin dispersant with a reaction agent, the dispersed state of the pigment is effectively destabilized to form an aggregate of the pigment. On the contrary, it has been found that in such a system that a reaction inhibitor is combined in that system, the destabilization of the dispersed state of the pigment is suppressed, and the formation of the aggregate is also suppressed. Thus, the present inventors have paid particular attention to the following combination among such combinations to conduct the investigation repeatedly. The combination is a combination of a pigment dispersed by a water-soluble resin (hereinafter may be referred to a resin-dispersed pigment) as a coloring material, a polyvalent metal ion derived from a polyvalent metal salt as a reaction agent and a polyoxyethylene alkyl ether (nonionic surfactant) as a reaction inhibitor.

The reaction of an ink containing a resin-dispersed pigment with a reaction liquid containing a polyvalent metal ion has heretofore been utilized. In addition, some nonionic surfactant is also known to lower the reactivity between a resin-dispersed pigment and a polyvalent metal ion. The invention described in Japanese Patent Application Laid-Open No. 2008-155520 is an invention relating to a recording apparatus certainly making good use of these techniques. The ink containing the resin-dispersed pigment, the reaction liquid containing the polyvalent metal ion and another ink containing the reaction inhibitor are used, thereby suppressing sticking in an absorber within a cap or in a waste liquid absorber.

The present inventors have pursued the above-described techniques and carried out an investigation about whether the sticking on the ejection orifice surface of a recording head can be suppressed without using the ink containing the reaction inhibitor or not. Specifically, the destabilization of the dispersed state of a pigment when the resin-dispersed pigment has been mixed with the polyvalent metal ion, and the stabilization of the dispersed state of the pigment and the dissolved state of the water-soluble resin by the nonionic surfactant have been analyzed in more detail. As a result, the following findings have been obtained.

First, the former reaction, i.e., the destabilization of the dispersed state of a pigment when the resin-dispersed pigment has been mixed with the polyvalent metal ion is caused in the following manner. Since the water-soluble resin is adsorbed on the surface of pigment particles in the ink, the dispersed state of the pigment is kept stable by steric repulsion of this water-soluble resin. When this resin-dispersed pigment is mixed with the polyvalent metal ion, the water-solubility of the water-soluble resin whose acidic group is in an anion form is markedly lowered by the action of the polyvalent metal ion (cation). Thus, the occupation volume of the resin in the mixed liquid becomes small, so that steric repulsion between pigment particles becomes weak. The pigment particles thereby collide with each other, and so the destabilization of the dispersed state of the pigment is caused. At the same time, a water-soluble resin which is not adsorbed on the surface of the pigment particle is also made insoluble by the action of the polyvalent metal ion, and the thus formed insoluble matter of the resin also contributes to the aggregation of the pigment.

Then, the latter reaction, i.e., the stabilization of a pigment and a water-soluble resin by a nonionic surfactant is caused in the following manner. That is, in an ink containing a nonionic surfactant and a resin-dispersed pigment, the nonionic surfactant is oriented to the surface of pigment particles and to a hydrophobic portion of the water-soluble resin, and the dispersed state of the pigment and the dissolved state of the water-soluble resin are kept stable by the water-solubility of that nonionic surfactant. Since the nonionic surfactant is dissolved in water by forming a hydrogen bond with water by a hydrophilic portion thereof, the nonionic surfactant is hard to be affected by the polyvalent metal ion. As described above, the stabilization of the pigment and the water-soluble resin by the nonionic surfactant is made by its interaction with the pigment and the water-soluble resin, and such stabilization is not brought by forming such a structure as a chelate structure of the nonionic surfactant and the polyvalent metal ion.

Then, the present inventors have carried out an investigation about the time when the above-described two actions occur when three liquids of an aqueous dispersion liquid containing the pigment dispersed by the resin dispersant, an aqueous solution containing the polyvalent metal ion and an aqueous solution of the nonionic surfactant are mixed. As a result, it has been found that the destabilization of the dispersed state of the pigment by the polyvalent metal ion is first caused, and the stabilization of the pigment and the water-soluble resin by the nonionic surfactant is then caused.

The present inventors understand this phenomenon to be as follows. The polyvalent metal salt used as a reaction agent is present in an aqueous solution in a state of being ionized into a polyvalent metal ion and an anion because it is easily soluble in water. On the other hand, the nonionic surfactant is present in the aqueous solution in such a state that a micelle has been formed. When such three liquids are mixed, the polyvalent metal ion rapidly approaches the pigment to markedly lower the water-solubility of the resin and weaken the steric repulsion. On the other hand, the nonionic surfactant stabilizes the dispersed state of the pigment and the dissolved state of the water-soluble resin only after the micelle structure formed by an interaction between hydrophobic portions is destroyed once, and then the hydrophobic portions then interact with the surface of the pigment particle and the hydrophobic portion of the water-soluble resin. As described above, a difference in present state between the polyvalent metal ion and the nonionic surfactant in the aqueous solution is considered to vary the time when the above-described two actions occur.

Taking into account understanding of these phenomena, the present inventors have investigated a technique for suppressing the sticking on the ejection orifice surface of the recording head without using the ink containing the reaction inhibitor to lead to completion of the present invention. Specifically, both a polyvalent metal ion as the reaction agent and a specific nonionic surfactant as the reaction inhibitor are contained in the reaction liquid, a resin-dispersed pigment is used as the coloring material in the ink, and these are combined to provide a set. This constitution has been able to be reached through deep understanding as to the interactions respectively exerted by the resin-dispersed pigment, the polyvalent metal ion and the nonionic surfactant and the time when these interactions occur. By taking this constitution, a high optical density can be achieved while satisfying the fixability of the image for adapting to high speed recording, and the sticking on the ejection orifice surface of the recording head can be suppressed without using another ink. The present inventors guess the mechanism to achieve such effects to be as follows.

First, a phenomenon caused when the reaction liquid and the ink of the above-described constitution are mixed on a recording medium is described. In this case, the polyvalent metal ion contained in the reaction liquid rapidly destabilizes the dispersed state of the pigment contained in the ink, thereby aggregating the pigment. Other water-soluble components (including nonionic surfactants derived from the reaction liquid) rapidly penetrate and diffuse into a recording medium because the ink has penetrability to some extent, so that the stabilization of the pigment and the water-soluble resin by the nonionic surfactant does not occur. In this manner, when the reaction liquid and the ink are applied to a recording medium, a high optical density is achieved while satisfying the fixability of an image like the case where no reaction inhibitor is present.

Then, a phenomenon caused when the reaction liquid and the ink of the above-described constitution are mixed on an ejection orifice surface of a recording head is described. In this case, the polyvalent metal ion contained in the reaction liquid first rapidly destabilizes the dispersed state of the pigment contained in the ink like the case of being mixed on the recording medium, thereby aggregating the pigment. However, a phenomenon caused thereafter is different from the case of being mixed on the recording medium, and the stabilization of the pigment by the nonionic surfactant occurs because other water-soluble components (including nonionic surfactants derived from the reaction liquid) are present together with the pigment aggregated. In this manner, the sticking on the ejection orifice surface of the recording head is suppressed.

In order to confirm the phenomenon caused on the ejection orifice surface of the recording head in particular of the above-described mechanism, the present inventors have made an evaluation with the dispersing method of the pigment and the reaction agent changed as follows. Specifically, an evaluation has been carried out on a combination of an ink containing a self-dispersible pigment having an acidic group bonded to the surface of a pigment particle and a reaction liquid containing a polyvalent metal ion and a combination of an ink containing a resin-dispersed pigment and a reaction liquid having buffering ability in an acidic region. However, even in any case thereof, the sticking on the ejection orifice surface of the recording head has been unable to be suppressed.

First, the combination of the ink containing the self-dispersible pigment and the reaction liquid containing the polyvalent metal ion is considered. In the self-dispersible pigment, the acidic group bonded to the surface of the pigment particle is in an anion form, and so the dispersed state of the pigment is kept stable by an electrical double layer formed thereby. When the polyvalent metal ion is mixed with the ink containing this self-dispersible pigment, the electrical double layer is rapidly compressed, and the dispersed state of the pigment is destabilized. Since this reaction is caused to quickly proceed, an aggregate of the pigment becomes large. If the nonionic surfactant is present in this case, the dispersed state cannot be stabilized because the aggregate is large. It is thus considered that the sticking on the ejection orifice surface of the recording head has been unable to be suppressed.

Then, the combination of the ink containing the resin-dispersed pigment and the reaction liquid having buffering ability in the acidic region is considered. When these are mixed, the pH of the mixture becomes acidic because the reaction liquid has buffering ability in the acidic region. In the acidic region, most of the acidic group of the water-soluble resin adsorbed on the surface of the pigment particle changes from an anion form to an acid form, and so the water-soluble resin is rapidly insolubilized. The steric repulsion by which the pigment has been dispersed is thereby weakened to destabilize the dispersed state of the pigment. At this time, the insolubilization of the water-soluble resin is caused to almost completely proceed because the reaction liquid has buffering ability, so that an aggregate of the pigment becomes large. If the nonionic surfactant is present in this case, the dispersed state cannot be stabilized because the aggregate is large. It is thus considered that the sticking on the ejection orifice surface of the recording head has been unable to be suppressed.

The latter combination is the same as the constitution of the present invention in that the resin-dispersed pigment is contained. However, they are different in that the reaction agent contained in the reaction liquid is the polyvalent metal ion and the acid. The resin having the acidic group is dissolved in water by hydrogen bonding with water formed by the anionic acidic group thereof. The acid changing the acidic group from an anion form to an acid form has higher capability to disconnect the hydrogen bond than the polyvalent metal ion electrostatically interacting with the acidic group of an anion form. Accordingly, the difference in the result as to the sticking on the ejection orifice surface of the recording head between the polyvalent metal ion and the acid is considered to be also attributable to the feature that the acid more efficiently insolubilizes the water-soluble resin.

As described above, the combination of the ink containing the resin-dispersed pigment and having penetrability to some extent and the reaction liquid containing the polyvalent metal salt and the nonionic surfactant is effective to improve the fixability and the optical density of an image and suppress the sticking on the ejection orifice surface of the recording head. Requirements of the respective components necessary for achieving these effects will hereinafter be described.

The requirements of the nonionic surfactant necessary for suppressing the sticking on the ejection orifice surface of the recording head are first described. According to the mechanism described above, the structure of the hydrophobic portion for interacting with the surface of the pigment particle and the hydrophobic portion of the water-soluble resin, the hydrophilicity of the surfactant for causing interacted ones to be stably present, and further the content for stabilizing the pigment and water-soluble resin in the ink are important. The present inventors have investigated these requirements in more detail, thereby ascertain that the following requirements are necessary for suppressing the sticking on the ejection orifice surface of the recording head. In the present invention, a nonionic surfactant acting as a reaction inhibitor is contained in a reaction liquid. The nonionic surfactant is required to be an ethylene oxide adduct of a higher alcohol selected from the group consisting of a linear primary alcohol, a linear secondary alcohol and an isoalkyl alcohol and to have an HLB value of 13.0 or more as determined by the Griffin method.

On the other hand, in the case of such a structure that an alkyl chain that is a hydrophobic portion of a nonionic surfactant is branched at a plurality of portions, such a nonionic surfactant is hard to interact with the surface of the pigment particle and the hydrophobic portion of the water-soluble resin due to its steric hindrance. When that having an HLB value less than 13.0 is used as the ethylene oxide adduct of the higher alcohol, the hydrophilicity of such a nonionic surfactant is low and cannot stabilize the pigment and the water-soluble resin.

According to the investigation by the present inventors, it is necessary to make sufficient the amount of the nonionic surfactant sufficient to the amounts of the pigment and the water-soluble resin for stabilizing the pigment and the water-soluble resin in the ink by the nonionic surfactant. Specifically, the content (% by mass) of the nonionic surfactant in the reaction liquid is required to be 0.15 times or more in terms of mass ratio as much as the total content (% by mass) of the pigment and the water-soluble resin in the ink. If the mass ratio is less than 0.15 times, the sticking on the ejection orifice surface of the recording head cannot be suppressed.

The present inventors have then carries out an investigation with a view toward enhancing the reactivity between the reaction liquid and the ink while satisfying the excellent fixability of an image for adapting to high speed recording to improve the optical density of the image. In order to improve the optical density, it is effective to inhibit the penetration of an ink into a recording medium. In that case, the drying of the ink becomes slow to become disadvantageous to the improvement of the fixability. Thus, in the present invention, the ink is caused to have penetrability to some extent to ensure the fixability, and the reactivity is enhanced to improve the optical density. In the present invention, first, the ink is required to have a surface tension of 38 mN/m or less for satisfying the fixability of an image for adapting to high speed recording. If the surface tension is higher than 38 mN/m, the optical density tends to be improved, but the fixability becomes insufficient.

From the requirement for the sticking suppression, it is necessary to use a polyvalent metal ion as a reaction agent. Accordingly, a polyvalent metal salt is used upon the preparation of the reaction liquid, and a polyvalent metal ion generated by its dissociation is contained in the reaction liquid. It is also necessary to use a pigment dispersed by the water-soluble resin as a coloring material. Under such a premise, the present inventors have investigated various polyvalent metal ions and water-soluble resins and the contents thereof. As a result, it has been derived to require the following requirements. In the present invention, the content ($\mu$mol/g) of the polyvalent metal ion in the reaction liquid is required to be 10.0 times or more in terms of molar ratio as much as the amount ($\mu$mol/g) of an acidic group derived from the water-soluble resin in the ink. If the molar ratio is less than 10.0 times, the optical density is not improved.

The ink constituting the set according to the present invention may contain another water-soluble resin than the water-soluble resin used for dispersing the pigment for the purpose of imparting a function to an image. The above requirement that "the molar ratio is 10.0 times or more" means that the amount of the polyvalent metal ion in the reaction liquid has to be determined according to the amount of the acidic groups derived from all the water-soluble resins in the ink used in combination. In the following case, the amount of the polyvalent metal ion constituting the reaction liquid has to be increased according to that case. That is, this case corresponds to a case where the amount of the acidic group of the water-soluble resin is large, i.e., a case where its acid value is high, or a case where the content of the water-soluble resin in the ink is high (for example, the ratio resin/pigment in the ink is high, or the amount of the water-soluble resin added is large).

Set of Ink and Reaction Liquid:

The ink and the reaction liquid constituting the set according to the present invention will now be respectively described in detail.

Reaction Liquid:

The reaction liquid constituting the set according to the present invention contains a polyvalent ion acting as a reaction agent and a specific nonionic surfactant acting as a reaction inhibitor and reacts with the ink used in combination. Incidentally, the reaction between the reaction liquid and the ink in the present invention is caused by a cation-anion ionic reaction brought about by the polyvalent metal ion in the reaction liquid and the component (the acidic group of the water-soluble resin used as the dispersant for dispersing the pigment) in the ink. Since the reaction liquid is used in combination with the ink when an image is formed, the reaction liquid is required to contain no coloring material and is favorably colorless without exhibiting absorption in a visible region in view of an influence on the image. However, the reaction liquid may be of a light color exhibiting absorption in the visible region so far as no influence is exerted on an actual image. The respective components constituting the reaction liquid will now be described by mentioning specific examples thereof.

Polyvalent Metal Ion:

The reaction liquid constituting the set according to the present invention contains a polyvalent metal ion as a reaction agent. The reaction liquid containing the polyvalent metal ion is easily obtained by adding a water-soluble compound with a polyvalent metal ion bonded to an anion, i.e., a water-soluble polyvalent metal salt, into a reaction liquid. The reason for it is that when the water-soluble polyvalent metal salt is added, the polyvalent metal salt is present in the reaction liquid in such a state that at least a part thereof has been dissociated into a polyvalent metal ion and an anion. Incidentally, the polyvalent metal salt present in the reaction liquid is expressed as "polyvalent metal ion" for convenience sake. However, this includes a case where at least a part of the polyvalent metal ion is present in the reaction liquid in a state of salts.

As described above, the content (μmol/g) of the polyvalent metal ion in the reaction liquid is required to be 10.0 times or more in terms of molar ratio as much as the amount (μmol/g) of an acidic group derived from the water-soluble resin in the ink. Since the polyvalent metal salt may easily precipitate in some cases when an aqueous medium constituting the reaction liquid has evaporated, the molar ratio is favorably 50.0 times or less, more favorably 30.0 times or less, particularly favorably 20.0 times or less. Incidentally, when a plurality of polyvalent metal ions or a plurality of resins are present in the reaction liquid or the ink when this molar ratio is calculated, the calculation is made based on the total amount thereof.

In the present invention, the content (% by mass) of the polyvalent metal salt in the reaction liquid is favorably 3.0% by mass or more and 20.0% by mass or less based on the total mass of the reaction liquid. If the content is less than 3.0% by mass, it takes a long time to destabilize the dispersed state of the pigment in the ink, and it may be hard in some cases to achieve a sufficient optical density. If the content is more than 20.0% by mass on the other hand, the polyvalent metal salt may easily precipitate in some cases when the aqueous medium constituting the reaction liquid has evaporated.

Examples of the polyvalent metal ion include divalent metal ions such as $Ca^{2+}$, $Cu^{2+}$, $Ni^{2+}$, $Mg^{2+}$, $Zn^{2+}$, $Sr^{2+}$ and $Ba^{2+}$, and trivalent metal ions such as $Al^{3+}$, $Fe^{3+}$, $Cr^{3+}$ and $Y^{3+}$. In the present invention, it is favorable to use such a polyvalent metal ion high in cohesiveness as bring about a strong ionic reaction with the acidic group of the water-soluble resin in the ink. For this reason, the polyvalent metal ion constituting the reaction liquid is favorably at least one selected from the group consisting of $Ca^{2+}$, $Al^{3+}$ and $Y^{3+}$. Among these, $Ca^{2+}$ is particularly favorable. Examples of a counter ion forming the polyvalent metal salt together with the polyvalent metal ion include inorganic anions such as $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $PO_4^{3-}$, $HPO_4^{2-}$ and $H_2PO_4^-$, and organic anions such as $HCO_3^-$, $HCOO^-$, $(COO^-)_2$. $COOH(COO^-)$, $CH_3COO^-$, $C_2H_4(COO^-)_2$, $C_6H_5COO^-$, $C_6H_4(COO^-)_2$ and $CH_3SO_4^-$. In the present invention, the anion is particularly favorably $NO_3+$ because its solubility in the aqueous medium constituting the reaction liquid is excellent. From the above reasons, $Ca(NO_3)_2$ is particularly favorably used upon the preparation of the reaction liquid. Incidentally, the polyvalent metal salt may be used in the form of a hydrate.

Surfactant:

The reaction liquid constituting the set according to the present invention contains an ethylene oxide adduct of a higher alcohol selected from the group consisting of a linear primary alcohol, a linear secondary alcohol and an isoalkyl alcohol and have an HLB value of 13.0 or more. Favorable specific examples of the higher alcohol include capryl alcohol, lauryl alcohol, secondary tridecyl alcohol, myristyl alcohol, cetyl alcohol, isocetyl alcohol, palmitoyl alcohol, stearyl alcohol, isostearyl alcohol, oleyl alcohol, linoleyl alcohol and behenyl alcohol.

In the present invention, the number of carbon atoms of the higher alcohol is favorably 12 or more and 22 or less. If the number of carbon atoms is less than 12, the hydrophobicity of such a surfactant is low, and its surface activating ability becomes too low. If the number of carbon atoms is more than 22 on the other hand, the hydrophobicity of the surfactant becomes too high, and difficulty may be encountered in some cases on causing the surfactant to be stably present in the ink. In addition, the surfactant may also adhere to the ejection orifice surface of a recording head in some cases. In order for the surfactant to effectively orient to the surface of the pigment particle and the water-soluble resin, the number of carbon atoms of the higher alcohol is favorably 16 or more. According to such a higher alcohol, its interaction with the surface of the pigment particle and the hydrophobic portion of the water-soluble resin can become stronger compared with a case of an ethylene oxide adduct of a higher alcohol the number of carbon atoms of which is less than 16. In the present invention, the number of ethylene oxide groups added is favorably 10 or more and 50 or less, more favorably 10 or more and 30 or less.

In the reaction liquid constituting the set according to the present invention, the content (% by mass) of the surfactant in the reaction liquid is required to be 0.15 times or more in terms of mass ratio as much as the total content (% by mass) of the pigment and the water-soluble resin in the ink. Since the ejection of the reaction liquid may become unstable in some cases, the mass ratio is favorably 1.00 time or less, more favorably 0.70 times or less, particularly favorably 0.50 times or less though it varies according to the structure and HLB value of the surfactant. Incidentally, the content of the nonionic surfactant when this mass ratio is calculated is a value based on the total mass of the reaction liquid, and both of the contents of the pigment and the water-soluble resin are values based on the total mass of the ink. When plural pigments and water-soluble resins are present in the ink, the contents are calculated based on the total amount thereof.

The content (% by mass) of the surfactant in the reaction liquid is favorably 0.10% by mass or more and 2.5% by mass or less, more favorably 0.30% by mass or more and 2.5% by mass or less, based on the total mass of the reaction liquid though it varies according to the structure and HLB value of the surfactant. Incidentally, when two or more surfactants satisfying the requirement defined in the present invention are used, the content of the surfactant is the total content thereof.

The ethylene oxide adduct of the higher alcohol used in the reaction liquid constituting the set according to the present invention is required to have an HLB value of 13.0 or more as determined by the Griffin method. Incidentally, the upper limit of the HLB value is 20.0 as described below. Thus, the upper limit of the HLB value of the ethylene oxide adduct of the higher alcohol used in the present invention is also 20.0 or less.

The Griffin method utilized for defining the HLB value of the surfactant in the present invention is described. The HLB value by the Griffin method is determined according to the following equation (1) from the formula weight of a hydrophilic group of a surfactant and the molecular weight of the surfactant and indicates the degree of hydrophilicity or lipophilicity of the surfactant in a range of from 0.0 to 20.0. The lower the HLB value, the higher the lipophilicity, i.e., the hydrophobicity of the surfactant. On the other hand, the higher the HLB value, the higher the hydrophilicity of the surfactant.

*HLB* value=20×(Formula weight of the hydrophilic group of the surfactant)/(Molecular weight of the surfactant).     Equation 1

In the present invention, a publicly known surfactant generally used in a reaction liquid for ink jet may be further contained in addition to the specific surfactant so far as the effects of the present invention are not prevented. Specific examples thereof include other nonionic surfactants than those described above, such as polyoxyethylene alkyl ethers, acetylene glycol compounds, ethylene oxide adducts of acetylene glycol and polyoxyethylene-polyoxypropylene block copolymers, anionic surfactants, cationic surfactants, amphoteric surfactants such as betaine compounds, and surfactants such as fluorine compounds and silicone compounds.

Aqueous Medium:

Water or a mixed solvent of water and a water-soluble organic solvent is favorably contained as an aqueous medium in the reaction liquid constituting the set according to the present invention. Deionized water or ion-exchanged water is favorably used as water. In the present invention, an aqueous reaction liquid containing at least water as the aqueous medium is particularly favorably provided. The content (% by mass) of water in the reaction liquid is favorably 25.0% by mass or more and 95.0% by mass or less, more favorably 50.0% by mass or more and 95.0% by mass or less, based on the total mass of the reaction liquid. All of publicly known water-soluble organic solvents generally used in a reaction liquid for ink jet may be used as the water-soluble organic solvent. One or more water-soluble organic solvents may be used. Specific examples thereof include monohydric or polyhydric alcohols, alkylene glycols the alkylene group of which has about 1 to 4 carbon atoms, polyethylene glycols having an average molecular weight of about 200 to 2,000, glycol ethers and nitrogen-containing compounds. The content (% by mass) of the water-soluble organic solvent in the reaction liquid is favorably 3.0% by mass or more and 70.0% by mass or less, more favorably 3.0% by mass or more and 50.0% by mass or less, based on the total mass of the reaction liquid.

Other Components:

In addition to the above-described components, an organic compound that is solid at ordinary temperature, for example, a nitrogen-containing compound such as urea or ethyleneurea, and trimethylolethane or trimethylolpropane, may also be contained in the reaction liquid constituting the set according to the present invention as needed. In addition to the above-described components, various additives such as a polymer compound, a pH adjustor, an antifoaming agent, a rust preventive, a preservative, a mildewproofing agent, an antioxidant, an anti-reducing agent, an evaporation accelerator and a chelating agent may also be further contained in the reaction liquid as needed.

Ink:

The ink constituting the set according to the present invention contains a pigment, and the pigment is dispersed by a water-soluble resin. No particular limitation is imposed on the hue of the ink, and the ink may be provided as a cyan, magenta, yellow, black, red, blue or green ink. The respective components constituting the ink will now be described.

Pigment:

The ink constituting the set according to the present invention contains a pigment as a coloring material. No particular limitation is imposed on the kind of the pigment usable in the present invention, and all of publicly known inorganic pigments and organic pigments may be used. Specific examples thereof include inorganic pigments such as calcium carbonate, titanium oxide and carbon black, and organic pigments such as azo, phthalocyanine and quinacridone. The content (% by mass) of the pigment in the ink is favorably 0.1% by mass or more and 15.0% by mass or less, more favorably 0.2% by mass or more and 10.0% by mass or less, based on the total mass of the ink. Another coloring material such as a publicly known dye may also be contained in addition to the pigment in the ink.

Water-Soluble Resin:

The ink constituting the set according to the present invention uses a water-soluble resin as a resin dispersant for dispersing such a pigment as described above in the aqueous medium. In other words, the water-soluble resin physically adheres or chemically bonds to the pigment in the ink, and the pigment is dispersed by steric repulsion of the water-soluble resin. In the present invention, such a dispersing system that the water-soluble resin is physically adsorbed on the surface of a pigment particle by a hydrophobic interaction is particularly favorably utilized. Incidentally, in the present invention, "a resin is water-soluble" means that the resin does not make a particle that has a measurable particle size when the resin is neutralized with an alkali equivalent to the acid value of the resin. A resin satisfying such conditions is described as the water-soluble resin in the present invention. The content (% by mass) of the water-soluble resin in the ink is favorably 0.1% by mass or more and 5.0% by mass or less, more favorably 0.3% by mass or more and 3.0% by mass or less, based on the total mass of the ink.

The water-soluble resin contained as the resin dispersant in the ink favorably has at least the following hydrophilic unit and hydrophobic unit as component units. Incidentally, (meth)acrylic in the following description indicates both acrylic and methacrylic.

Examples of a monomer having a hydrophilic group which will becomes a hydrophilic unit by polymerization include anionic monomers such as acidic monomers having a carboxy group, such as (meth)acrylic acid, itaconic acid, maleic acid and fumaric acid, acidic monomers having a phosphonic group, such as (meth)acrylic acid-2-ethyl phosphonate, and anhydrides and salts of these acidic monomers, and monomers having a hydroxyl group, such as 2-hydroxyethyl(meth)acrylate and 3-hydroxypropyl(meth)acrylate. Incidentally, examples of a cation forming a salt with an anionic monomer include ions of lithium, sodium, potassium, ammonium and organic ammonium.

Examples of a monomer having a hydrophobic group which will becomes a hydrophobic unit by polymerization include monomers having an aromatic ring, such as styrene, α-methylstyrene, benzyl(meth)acrylate, and monomers having an aliphatic group, such as ethyl(meth)acrylate, methyl (meth)acrylate, (iso)propyl(meth)acrylate, (n-, iso-, t-)butyl (meth)acrylate and 2-ethylhexyl(meth)acrylate.

In the present invention, the water-soluble resin contained in the ink particularly favorably has an acidic group whose pKa value is lower than the pH of the ink. Favorable specific examples of the acidic monomer having such an acidic group include monomers having a carboxyl group, such (meth) acrylic acid and maleic acid. In the present invention, a copolymer having at least a hydrophilic unit derived from the monomer having the carboxyl group and a hydrophobic unit derived from the monomer having the aromatic ring or the monomer having the aliphatic group is particularly favorably used as the water-soluble resin. More specifically, such a water-soluble resin as described below is favorably used. Examples of such a water-soluble resin include styrene-(meth)acrylic acid copolymers, styrene-(meth)acrylic acid-alkyl(meth)acrylate terpolymers, styrene-maleic acid copolymers, styrene-maleic acid-alkyl(meth)acrylate terpolymers, styrene-maleic acid half ester copolymers, vinylnaphthalene-(meth)acrylic acid copolymers, vinylnaphthalene-maleic acid copolymers, styrene-maleic anhydride-maleic acid half ester terpolymers and salts thereof.

The acid value of the water-soluble resin favorably used as the resin dispersant contained in the ink is favorably 80 mg KOH/g or more and 300 mg KOH/g or less, more favorably 80 mg KOH/g or more and 180 mg KOH/g or less, from the viewpoint of achieving both reliability as the ink, such as ejection stability and storage stability and reactivity between the ink and the reaction liquid. If the acid value is more than 300 mg KOH/g, the hydrophobicity of such a water-soluble resin becomes too low, and so its hydrophobic interaction with the pigment becomes weak, so that it may be difficult in some cases to stably disperse the pigment. If the acid value is less than 80 mg KOH/g on the other hand, the water-solubility of such a resin becomes low, so that, it may take a long time in some cases for a dispersing treatment for stably dispersing the pigment. If the acid value is more than 180 mg KOH/g, it may be difficult in some cases to achieve the effects of the present invention. The reason for this is that when the ink comes into contact with the reaction liquid on a recording medium, the acidic group of the resin of an anion form that remains in the vicinity of the pigment particle is liable to be relatively much compared with the amount of the polyvalent metal ion, and the optical density is liable to be somewhat lowered.

The content (% by mass) of the water-soluble resin in the ink constituting the set according to the present invention is favorably 0.15 times or more and 1.00 time or less in terms of mass ratio as much as the content (% by mass) of the pigment. Incidentally, the contents of the water-soluble resin and the pigment in this case are values based on the total mass of the ink. If the mass ratio is less than 0.15 times, it may take a long time in some cases for a dispersing treatment for stably dispersing the pigment. If the mass ratio is more than 1.00 time on the other hand, a part of the water-soluble resin comes to be present in a state of being dissolved in the aqueous medium without contributing to the dispersion of the pigment. As a result, the viscosity of the ink becomes too high, so that the ejection stability of the ink may be lowered in some cases.

Incidentally, a water-soluble resin may also be added to the ink for the purpose of imparting a function to an image in addition to the purpose of dispersing the pigment in the ink. In addition to such a water-soluble resin used for dispersing the pigment in the ink as described above, for example, a polyurethane resin, a polyester resin or a polyolefin resin may also be used as the water-soluble resin used for that purpose. Incidentally, a resin using that having a nonionic group such as ethylene oxide as a monomer is not so favorable because the strength of a film formed on a recording medium may be weakened in some cases.

Aqueous Medium:

Water or a mixed solvent of water and a water-soluble organic solvent is favorably contained as an aqueous medium in the ink constituting the set according to the present invention. Deionized water or ion-exchanged water is favorably used as water. In the present invention, an aqueous ink containing at least water as the aqueous medium is particularly favorably provided. The content (% by mass) of water in the ink is favorably 50.0% by mass or more and 95.0% by mass or less based on the total mass of the ink. All of publicly known water-soluble organic solvents generally used in an ink for ink jet may be used as the water-soluble organic solvent. One or more water-soluble organic solvents may be used. Specific examples thereof include monohydric or polyhydric alcohols, alkylene glycols the alkylene group of which has about 1 to 4 carbon atoms, polyethylene glycols having an average molecular weight of about 200 to 2,000, glycol ethers and nitrogen-containing compounds. The content (% by mass) of the water-soluble organic solvent in the ink is favorably 3.0% by mass or more and 50.0% by mass or less based on the total mass of the ink.

Other Components:

In addition to the above-described components, an organic compound that is solid at ordinary temperature, for example, a nitrogen-containing compound such as urea or ethyleneurea, and trimethylolethane or trimethylolpropane may also be contained in the ink constituting the set according to the present invention as needed. In addition to the above-described components, various additives such as a surfactant, a pH adjustor, an antifoaming agent, a rust preventive, a preservative, a mildewproofing agent, an antioxidant, an antireducing agent, an evaporation accelerator and a chelating agent may also be further contained in the reaction liquid as needed.

A surfactant acting as a penetrant is particularly favorably contained in the ink constituting the set according to the present invention. All of publicly known surfactants generally used in an ink for ink jet may be used as the surfactant. One or more surfactants may be used. Specific examples thereof include nonionic surfactants such as polyoxyethylene alkyl ethers, acetylene glycol compounds, ethylene oxide adducts of acetylene glycol and polyoxyethylene-polyoxypropylene block copolymers, anionic surfactants, cationic surfactants, amphoteric surfactants such as betaine compounds, and surfactants such as fluorine compounds and silicone compounds. The content (% by mass) of the surfactant in the ink is favorably 0.1% by mass or more and 2.0% by mass or less, more favorably 0.3% by mass or more and 1.5% by mass or less, based on the total mass of the ink though it varies according to the structure and HLB value of the surfactant.

The surface tension of the ink constituting the set according to the present invention is required to be 38 mN/m or less, and the surface tension is favorably 25 mN/m or more and 38 mN/m or less, more favorably 34 mN/m or less. If the surface tension is less than 25 mN/m, such an ink tends to excessively penetrate into a recording medium, so that the ink may reach a back surface of the recording medium in some cases to easily cause strike-through. The surface tension of the ink can be controlled by suitably determining the kinds and contents of the water-soluble organic solvent and the surfactant. Incidentally, the surface tension of the ink is a static surface tension at 25° C. as measured by the platinum plate method. The pH of the ink is favorably 6.0 or more and 9.5 or less. If the pH is less than 6.0, the dispersion stability of the pigment tends to be lowered, and so the storage stability of the ink may be not sufficiently achieved in some cases. If the pH is more than 9.5 on the other hand, such a problem that the liquid-contact property of the ink with respect to a member constituting an ink jet recording apparatus is lowered may be liable to occur in some cases.

Image Forming Method:

An image forming method according to the present invention has a step of respectively ejecting an ink and a reaction liquid from a recording head of an ink jet system to apply them to a recording medium, wherein the ink and the reaction liquid are brought into contact with each other on the recording medium to form an image. At this time, the set according to the present invention which is made up of the ink and reaction liquid described above is used. As an apparatus for conducting the image forming method according to the present invention, is used an ink jet recording apparatus, and any publicly known construction may be adopted. As a recording head installed in the ink jet recording apparatus, there is such a system that a liquid is ejected by action of mechanical energy or thermal energy. However, the recording head of the system that the liquid is ejected by the action of the thermal energy is particularly favorably used in the present invention.

The order of the application of the ink and the reaction liquid to a recording medium includes cases where the reaction liquid is applied, and the ink is then applied, where the ink is applied, and the reaction liquid is then applied and where these are combined. In view of the object of the present invention, however, the case where the reaction liquid is applied, and the ink is then applied is favorably at least included. From the viewpoint of ejection stability from the recording head of the ink jet system, the viscosities of the ink and the reaction liquid are each favorably 1 mPa·s or more and 15 mPa·s or less, more favorably 1 mPa·s or more and 5 mPa·s or less, regarding characteristics thereof. In addition, the reaction liquid is favorably caused to efficiently react with the intended ink. Therefore, the surface tension of the reaction liquid is favorably controlled higher than that of the ink that is an object of being destabilized by the reaction liquid within limits capable of being ejected from the recording head in such a manner that the reaction liquid does not feather on another portion than a recording region with the desired ink.

The application amount of the reaction liquid to the recording medium may be suitably adjusted according to the kind and content of the polyvalent metal ion in the reaction liquid and the constitution of the ink to be reacted thereto. In the present invention, the application amount of the reaction liquid is favorably controlled to 0.5 g/m$^2$ or more and 10.0 g/m$^2$ or less, more favorably more than 2.0 g/m$^2$ and 5.0 g/m$^2$ or less, from the viewpoint of uniformity of the resulting image. Incidentally, when a region where the reaction liquid is applied is a certain portion with respect to the size (area: m$^2$) of the recording medium, the application amount value (g/m$^2$) of the reaction liquid is determined assuming that the reaction liquid is applied to the whole surface of the recording medium, and this value favorably satisfies the above range.

EXAMPLES

The present invention will hereinafter be described more specifically by the following Examples and Comparative Examples. However, the present invention is not limited to the following Examples unless going beyond the gist of the present invention. Incidentally, "parts" or "part" and "%" in the following are based on mass unless expressly noted. Various physical property values are values measured at 25° C.

Preparation of Pigment Dispersion Liquid:
Pigment Dispersion Liquid 1

Four parts of a styrene-acrylic acid copolymer (water-soluble resin) having an acid value of 120 mg KOH/g and a weight-average molecular weight of 8,000 was dissolved in ion-exchanged water with sodium hydroxide in such an amount that the neutralization equivalent is 1. To this solution, was added 10.0 part of carbon black having a specific surface area of 220 m$^2$/g and a DBP oil absorption of 105 mL/100 g, and ion-exchanged water was additionally added up to 100.0 parts in total. This mixture was subjected to a dispersing treatment for 3 hours by means of a batch type vertical sand mill. The resultant dispersion liquid is centrifuged, thereby removing coarse particles. Thereafter, the thus treated mixture was filtered under pressure through a microfilter (product of Fuji Film Co., Ltd.) having a pore size of 3.0 μm, and ion-exchanged water was added to obtain a pigment dispersion liquid 1. The content of the pigment in the pigment dispersion liquid 1 was 8.0%, and the content of the water-soluble resin was 3.2%.

Pigment Dispersion Liquid 2

A pigment dispersion liquid 2 was prepared in the same manner as in Pigment dispersion liquid 1 except that the kind of the water-soluble resin used upon the preparation of the pigment dispersion liquid 1 was changed to 3.0 parts of a styrene-acrylic acid copolymer (water-soluble resin) having an acid value of 180 mg KOH/g and weight-average molecular weight of 10,000. The content of the pigment in the pigment dispersion liquid 2 was 8.0%, and the content of the water-soluble resin was 2.4%.

Pigment Dispersion Liquid 3

A pigment dispersion liquid 3 was prepared in the same manner as in Pigment dispersion liquid 1 except that the kind of the pigment used upon the preparation of the pigment dispersion liquid 1 was changed to C.I. Pigment Blue 15:3 (Fastgen Blue FGF; product of DIC Co.). The content of the pigment in the pigment dispersion liquid 3 was 8.0%, and the content of the water-soluble resin was 3.2%.

Pigment Dispersion Liquid 4

A pigment dispersion liquid 4 was prepared in the same manner as in Pigment dispersion liquid 1 except that the kind of the water-soluble resin used upon the preparation of the pigment dispersion liquid 1 was changed to a butyl acrylate-acrylic acid copolymer (water-soluble resin) having an acid value of 120 mg KOH/g and weight-average molecular weight of 8,000. The content of the pigment in the pigment dispersion liquid 4 was 8.0%, and the content of the water-soluble resin was 3.2%.

Pigment Dispersion Liquid 5

A pigment dispersion liquid 5 was prepared in the same manner as in Pigment dispersion liquid 1 except that the kind of the water-soluble resin used upon the preparation of the pigment dispersion liquid 1 was changed to a benzyl methacrylate-methacrylic acid copolymer (water-soluble resin) having an acid value of 120 mg KOH/g and weight-average molecular weight of 8,000. The content of the pigment in the pigment dispersion liquid 5 was 8.0%, and the content of the water-soluble resin was 3.2%.

Pigment Dispersion Liquid 6

Ten parts of the following carbon black, 20.0 parts of the following water-soluble resin and 70.0 parts of water were mixed. That having a specific surface area of 210 m$^2$/g and a DBP oil absorption of 74 mL/100 g was used as the carbon black. A resin obtained by neutralizing a styrene-acrylic acid copolymer having an acid value of 200 mgKOH/g and a weight average molecular weight of 10,000 with a 10% by mass aqueous solution of sodium hydroxide was used as the water-soluble resin. The thus obtained mixture was subjected to a dispersing treatment for 1 hour by means of a sand grinder. The resultant dispersion liquid is centrifuged, thereby removing coarse particles. Thereafter, the thus treated mixture was filtered under pressure through a microfilter (product of Fuji Film Co., Ltd.) having a pore size of 3.0 μm, and ion-exchanged water was added to obtain the pigment dispersion liquid 6. The content of the pigment in the pigment dispersion liquid 6 was 10.0%, and the content of the water-soluble resin was 20.0%.

Pigment Dispersion Liquid 7

A commercially available pigment dispersion liquid (Cab-O-Jet 300; product of Cabot Co.) containing a self-dispersible carbon black with a $C_6H_4COONa$ group bonded to its particle surface was used as a pigment dispersion liquid 7. The content of the pigment in the pigment dispersion liquid 7 was 15.0%.

Preparation of Aqueous Resin Solution:

Aqueous Resin Solution 1

Ten parts of a styrene-acrylic acid copolymer (water-soluble resin) having an acid value of 120 mg KOH/g and a weight-average molecular weight of 8,000 was dissolved in ion-exchanged water with sodium hydroxide in such an amount that the neutralization equivalent is 1. The resultant aqueous solution was then filtered under pressure through a microfilter (product of Fuji Film Co., Ltd.) having a pore size of 3.0 μm, and ion-exchanged water was added to obtain an aqueous resin solution 1. The content of the water-soluble resin in the aqueous resin solution 1 was 10.0%.

Aqueous Resin Solution 2

A polyurethane resin having an acid value of 60 mg KOH/g and a weight-average molecular weight of 20,000 was dissolved in ion-exchanged water to obtain an aqueous resin solution 2. At this time, a sodium salt type water-soluble resin obtained by reacting respective compounds of isophorone diisocyanate, polypropylene glycol having an number average molecular weight of 2,000, dimethylol propionic acid and ethylenediamine by a conventional method was used as the urethane resin. The content of the water-soluble resin in the aqueous resin solution 2 was 10.0%.

Structure and Physical Properties of Surfactant:

In Table 1 are shown the structures and HLB values of respective surfactants. In addition, when the surfactant is a surfactant defined in the present invention, the general formula and number of carbon atoms of a higher alcohol and the number of ethylene oxide groups added are also shown collectively. Incidentally, the HLB value is a value determined by the Griffin method according to the equation (1). In Table 1, ACETYLENOL E100 (trade name) is a surfactant produced by Kawaken Fine Chemicals Co., Ltd. NIKKOL BC-20, BO-20, BB-20, BL-21, BT-12 and BC-10 (trade names) are all surfactants produced by Nikko Chemicals Co., Ltd. EMALEX 1825, 1615, 512 and CS-30 are all surfactants produced by Nihon Emulsion Co., Ltd.

ant mixtures were adjusted to pH 9.0 with a 10% aqueous solution of sodium hydroxide or 10% sulfuric acid. Thereafter, the respective mixtures were filtered under pressure through a microfilter (product of Fuji Film Co., Ltd.) having a pore size of 1.0 μm to prepare respective inks. In lower lines of Table 2 are shown the content (%) of the pigment and the content (%) of the water-soluble resin in each ink, and the amount (μmol/g) of the acidic group derived from the water-soluble resin. Here, the pH of each ink was adjusted to 9.0, and the acidic group of the water-soluble resin is a carboxyl group, so that its pKa is about 4 to 5. Therefore, the pKa of the acidic group derived from the water-soluble resin in each ink is lower than the pH of the ink. Incidentally, Ink 12 uses the self-dispersible carbon black, so that the amount of the acidic group of the water-soluble resin as defined in the present invention is 0.0. In the bottom line of Table 2 is shown the surface tension (mN/m) of each ink as measured by the platinum plate method by means of an automatic surface tensiometer (Model: CBVP-Z; manufactured by Kyowa Interface Science Co., Ltd.).

Incidentally, the amount (μmol/g) of the acidic group derived from the water-soluble resin in the ink can be calculated from the content of the water-soluble resin in the ink and the acid value thereof. Since the acid value is an amount (unit: mg) of potassium hydroxide required to neutralize 1 g of the resin the value (acid value)×$10^{-3}$/(molecular weight (56.1) of potassium hydroxide) amounts to the amount (μmol/g) of the acidic group present in 1 g of the resin. Accordingly, the amount (μmol/g) of the acidic group derived from the water-soluble resin in the ink can be calculated out according to the equation (amount (mol) of the acidic group present in 1 g of the resin)×(amount of the resin per gram of the ink (g/one g of ink))×1,000,000]. When the amount is calculated taking Ink 1 as an example, 1.2% of the water-soluble resin having an acid value of 120 mg KOH/g is contained in 1 g of Ink 1. Accordingly, the amount (μmol/g) of the acidic group derived from the water-soluble resin in the ink amounts to $(120 \times 10^{-3}/56.1) \times (1.2/100) \times 1,000,000 = 25.7$ (μmol/g). Incidentally, in order to determine the amount of the acidic group derived from the water-soluble resin in the ink from the ink containing the water-soluble resin, the acid value of the water-soluble resin precipitated in the ink by a method such as acid precipitation is found by titration, and the calculation is made in the same manner as described above, whereby such an amount can be determined.

TABLE 1

Structure and physical properties of surfactant

| | Structure | HLB value | Higher alcohol General formula | Number of carbon atoms | Number of ethylene oxide groups added |
|---|---|---|---|---|---|
| NIKKOL BC-20 | Polyoxyethylene cetyl ether | 15.7 | $C_{16}H_{33}OH$ | 16 | 20 |
| NIKKOL BO-20 | Polyoxyethylene oleyl ether | 15.3 | $C_{18}H_{35}OH$ | 18 | 20 |
| NIKKOL BB-20 | Polyoxyethylene behenyl ether | 14.6 | $C_{22}H_{45}OH$ | 22 | 20 |
| EMALEX 1825 | Polyoxyethylene isostearyl ether | 16.1 | $C_9H_{19}CH(C_7H_{15})CH_2OH$ | 18 | 25 |
| EMALEX 1615 | Polyoxyethylene isocetyl ether | 14.6 | $C_8H_{17}CH(C_6H_{13})CH_2OH$ | 16 | 15 |
| EMALEX 512 | Polyoxyethylene oleyl ether | 13.3 | $C_{18}H_{35}OH$ | 18 | 12 |
| NIKKOL BL-21 | Polyoxyethylene lauryl ether | 16.6 | $C_{12}H_{25}OH$ | 12 | 21 |
| NIKKOL BT-12 | Polyoxyethylene secondary tridecyl ether | 14.5 | $C_6H_{13}CH(C_6H_{13})OH$ | 13 | 12 |
| EMALEX CS-30 | Polyoxyethylene cholesteryl ether | 14.0 | — | 25 | 30 |
| ACETYLENOL E100 | Acetylene glycol ethylene oxide adduct | 13.3 | — | 14 | 10 |
| NIKKOL BC-10 | Polyoxyethylene cetyl ether | 12.9 | $C_{16}H_{33}OH$ | 16 | 10 |

Preparation of Ink:

After the respective components (unit: %) shown in upper lines of Table 2 were mixed and sufficiently stirred, the result-

TABLE 2

Composition and characteristics of ink

| | Ink No. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Pigment dispersion liquid 1 | 37.5 | 37.5 | | 37.5 | 37.5 | | | | 37.5 | 37.5 | 37.5 | | | | |
| Pigment dispersion liquid 2 | | | 37.5 | | | | | | | | | | | | |
| Pigment dispersion liquid 3 | | | | | | | | 37.5 | | | | | | | |
| Pigment dispersion liquid 4 | | | | | | 37.5 | | | | | | | | | |
| Pigment dispersion liquid 5 | | | | | | | 37.5 | | | | | | | | |
| Pigment dispersion liquid 6 | | | | | | | | | | | | | | 35.0 | 35.0 |
| Pigment dispersion liquid 7 | | | | | | | | | | | | 20.0 | 20.0 | | |
| Aqueous resin solution 1 | | 2.0 | | 4.0 | | | | | | | | | 12.0 | | |
| Aqueous resin solution 2 | | | | | 3.0 | | | | | | | | | | |
| Glycerol | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 |
| Ethylene glycol | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| 2-Pyrrolidone | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| ACETYLENOL E100 | 1.0 | 1.0 | 1.0 | 1.0 | 1.0 | 1.0 | 1.0 | 1.0 | 0.7 | 0.4 | 0.2 | 1.0 | 1.0 | 1.0 | 0.1 |
| Ion-exchanged water | 44.5 | 42.5 | 44.5 | 40.5 | 41.5 | 44.5 | 44.5 | 44.5 | 44.8 | 45.1 | 45.3 | 62.0 | 50.0 | 47.0 | 47.9 |
| Content of pigment | 3.0 | 3.0 | 3.0 | 3.0 | 3.0 | 3.0 | 3.0 | 3.0 | 3.0 | 3.0 | 3.0 | 3.0 | 3.0 | 3.5 | 3.5 |
| Content of water-soluble resin | 1.2 | 1.4 | 0.9 | 1.6 | 1.5 | 1.2 | 1.2 | 1.2 | 1.2 | 1.2 | 1.2 | 0.0 | 1.2 | 7.0 | 7.0 |
| Amount of acidic group | 25.7 | 29.9 | 28.9 | 34.2 | 28.9 | 25.7 | 25.7 | 25.7 | 25.7 | 25.7 | 25.7 | 0.0 | 25.7 | 250 | 250 |
| Surface tension | 32 | 32 | 32 | 32 | 32 | 32 | 32 | 32 | 34 | 38 | 40 | 32 | 32 | 32 | 42 |

Preparation of Reaction Liquid:

After the respective components (unit: %) shown in upper lines of Table 3 were mixed and sufficiently stirred, the resultant respective mixtures were filtered under pressure through a microfilter (product of Fuji Film Co., Ltd.) having a pore size of 3.0 μm to prepare respective reaction liquids. Incidentally, Reaction liquid 19 was adjusted to pH 4.0 with sulfuric acid.

In lower lines of Table 3 are shown the content (μmol/g) of the polyvalent metal ion and the content (%) of the surfactant in each reaction liquid. Incidentally, Reaction liquid 20 is a reaction liquid that has buffering ability near pH 4.0, thereby lowering the pH of an ink upon contact with the ink to destabilize the dispersed state of a pigment and does not contain a polyvalent metal ion.

TABLE 3

Composition and characteristics of reaction liquid

| | Reaction liquid No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Calcium nitrate | 5.0 | 4.3 | 5.0 | 5.0 | 6.0 | 5.0 | 5.0 | 5.0 | 5.0 | 5.0 | 5.0 | 5.0 | 5.0 |
| Calcium methanesulfonate | | | | | | | | | | | | | |
| Aluminum nitrate | | | | | | | | | | | | | |
| Yttrium nitrate | | | | | | | | | | | | | |
| Magnesium nitrate | | | | | | | | | | | | | |
| Trisodium citrate | | | | | | | | | | | | | |
| Glycerol | 5.0 | 5.0 | 5.0 | 5.0 | 5.0 | 5.0 | 5.0 | 5.0 | 5.0 | 5.0 | 5.0 | 5.0 | 5.0 |
| 1,5-Pentanediol | 5.0 | 5.0 | 5.0 | 5.0 | 5.0 | 5.0 | 5.0 | 5.0 | 5.0 | 5.0 | 5.0 | 5.0 | 10.0 |
| 1,2-Hexanediol | | | | | | | | | | | | | |
| Diethylene glycol | | | | | | | | | | | | | 5.0 |
| Trimethylolpropane | 7.0 | 7.0 | 7.0 | 7.0 | 7.0 | 7.0 | 7.0 | 7.0 | 7.0 | 7.0 | 7.0 | 7.0 | |
| NIKKOL BC-20 | 1.0 | 1.0 | 0.63 | 0.6 | 1.0 | | | | | | | | |
| NIKKOL BO-20 | | | | | | 1.0 | | | | | | | |
| NIKKOL BB-20 | | | | | | | 1.0 | | | | | | |
| EMALEX 1825 | | | | | | | | 1.0 | | | | | |
| EMALEX 1615 | | | | | | | | | 1.0 | | | | 1.0 |
| EMALEX 512 | | | | | | | | | | 1.0 | | | |
| NIKKOL BL-21 | | | | | | | | | | | 1.0 | | |
| NIKKOL BT-12 | | | | | | | | | | | | 1.0 | |
| EMALEX CS-30 | | | | | | | | | | | | | |
| ACETYLENOL E100 | | | | | | | | | | | | | |
| NIKKOL BC-10 | | | | | | | | | | | | | |
| Ion-exchanged water | 77.0 | 77.7 | 77.37 | 77.4 | 76.0 | 77.0 | 77.0 | 77.0 | 77.0 | 77.0 | 77.0 | 77.0 | 74.0 |
| Content of polyvalent metal ion | 305 | 262 | 305 | 305 | 366 | 305 | 305 | 305 | 305 | 305 | 305 | 305 | 305 |
| Content of surfactant | 1.0 | 1.0 | 0.63 | 0.6 | 1.0 | 1.0 | 1.0 | 1.0 | 1.0 | 1.0 | 1.0 | 1.0 | 1.0 |

| | Reaction liquid No. | | | | | | | | | | | |
|---|---|---|---|---|---|---|---|---|---|---|---|---|
| | 14 | 15 | 16 | 17 | 18 | 19 | 20 | 21 | 22 | 23 | 24 | 25 |
| Calcium nitrate | | | | | | | 5.0 | 5.0 | 5.0 | 5.0 | 3.8 | |
| Calcium methanesulfonate | 6.0 | | | | | | | | | | | |
| Aluminum nitrate | | 6.0 | | | | | | | | | | |
| Yttrium nitrate | | | 8.0 | | | | | | | | | |

TABLE 3-continued

| Composition and characteristics of reaction liquid | | | | | | | | | | | | |
|---|---|---|---|---|---|---|---|---|---|---|---|---|
| Magnesium nitrate | | | | 5.0 | 5.0 | | | | | | | 2.5 |
| Trisodium citrate | | | | | | 10.0 | | | | | | |
| Glycerol | 5.0 | 5.0 | 5.0 | 5.0 | 5.0 | 5.0 | 5.0 | 5.0 | 5.0 | 5.0 | 5.0 | 5.0 |
| 1,5-Pentanediol | 5.0 | 5.0 | 5.0 | 5.0 | 5.0 | 5.0 | 5.0 | 5.0 | 5.0 | 5.0 | 5.0 | 10.0 |
| 1,2-Hexanediol | | | | | | | 3.0 | | | | | |
| Diethylene glycol | | | | | | | | | | | | 5.0 |
| Trimethylolpropane | 7.0 | 7.0 | 7.0 | 7.0 | 7.0 | 7.0 | 7.0 | 7.0 | 7.0 | 7.0 | 7.0 | |
| NIKKOL BC-20 | 1.0 | 1.0 | 1.0 | 1.0 | | 1.0 | | | | | 1.0 | |
| NIKKOL BO-20 | | | | | | | | | | | | |
| NIKKOL BB-20 | | | | | | | | | | | | |
| EMALEX 1825 | | | | | | | | | | | | |
| EMALEX 1615 | | | | | | | | | | | | 1.0 |
| EMALEX 512 | | | | | | | | | | | | |
| NIKKOL BL-21 | | | | | 1.0 | | | | | | | |
| NIKKOL BT-12 | | | | | | | | | | | | |
| EMALEX CS-30 | | | | | | | | 1.0 | | | | |
| ACETYLENOL E100 | | | | | | | | | 1.0 | | | |
| NIKKOL BC-10 | | | | | | | | | | 1.0 | | |
| Ion-exchanged water | 76.0 | 76.0 | 74.0 | 77.0 | 77.0 | 72.0 | 75.0 | 77.0 | 77.0 | 77.0 | 78.2 | 76.5 |
| Content of polyvalent metal ion | 261 | 282 | 291 | 337 | 337 | 0 | 305 | 305 | 305 | 305 | 232 | 169 |
| Content of surfactant | 1.0 | 1.0 | 1.0 | 1.0 | 1.0 | 1.0 | 0.0 | 1.0 | 1.0 | 1.0 | 1.0 | 1.0 |

Evaluation:

The respective inks and reaction liquids obtained above were used to make up sets with the reaction liquid combined with the ink as shown on a left side of Table 4. In Table 4 are shown the content of the polyvalent metal ion in each reaction liquid, the molar ratio (times) of the polyvalent metal ion to the acidic group derived from the water-soluble resin in the ink and the content of the surfactant in the reaction liquid in terms of mass ratio (times) to the total content (total mass) of the pigment and water-soluble resin in the ink.

These sets were used to make evaluation under the following conditions. An apparatus obtained by modifying an ink jet recording apparatus (trade name: PIXUS Pro9500; manufactured by Canon Inc.) in which a recording head ejecting a liquid by the action of thermal energy was installed was used to form an image. An ink and a reaction liquid constituting a set were respectively charged into cartridges, the cartridge of the reaction liquid was set at a position of gray, and the cartridge of the ink was set at a position of yellow. Recording conditions are as follows. Recording was conducted by one-pass one-way recording in which an image of an arrangement width of ejection orifices of a recording head is recorded only by scanning starting from a home position of the recording head. The reaction liquid was applied to a recording medium by the same pass, and the ink was then applied so as to overlap therewith. In this embodiment, 1/600 inch×1/600 inch is defined as one pixel, the application amount of the reaction liquid to the recording medium was controlled to 7 ng per pixel, and the application amount of the ink to the recording medium was controlled to 16 ng per pixel. Images used in respective evaluations were formed on three recording media of PB PAPER GF-500 and Canon Extra (both, products of Canon Inc.), and PPC paper BUSINESS MULTIPURPOSE 4200 PAPER (product of Xerox Co.). In the present invention, A and B in respective evaluation criteria was regarded as an allowable level, and C was regarded as an unallowable level. Evaluation results are shown on a right side of Table 4.

Evaluation of Optical Density:

Each set shown in Table 4 was used to form a 5-cm by 5-cm solid image on each of the three recording media. After one day, a spectrophotometer (trade name: Spectorolino; manufactured by Gretag Macbeth Co.) was used to measure an optical density of the image under conditions of a light source: D50 and a visual field: 2°. The optical density was evaluated by an average value and the lowest value about the three recording media. The evaluation criteria of the optical density are as follows.

Evaluation Criteria in the Case of Black Solid Image:

A: The average value was 1.4 or more, and the lowest value was 1.3 or more;

B: The average value was 1.4 or more, and the lowest value was 1.2 or more and less than 1.3;

C: The average value was less than 1.4.

Evaluation Criteria in the Case of Cyan Solid Image:

A: The average value was 1.3 or more, and the lowest value was 1.2 or more;

B: The average value was 1.3 or more, and the lowest value was 1.1 or more and less than 1.2;

C: The average value was less than 1.3.

Evaluation of Fixability:

Each set shown in Table 4 was used to form a 5-cm by 5-cm solid image on each of the three recording media. After 3 seconds, the solid images thus formed were rubbed with Silbon paper on which a weight of 40 g/cm$^2$ was placed, to visually observe the degree of stain of unrecorded portions, thereby making evaluation as to the fixability with the average value thereof. The evaluation criteria of the fixability are as follows.

A: Stain was scarcely observed on the unrecorded portions of the recording media;

B: Stain was observed on the unrecorded portions of the recording media, but was at an allowable level;

C: Stain was markedly observed on the unrecorded portions of the recording media.

Evaluation of Sticking Suppression:

Each set shown in Table 4 was used to continuously record such a pattern that a solid image was formed on the whole surface of a A4-sized recording medium on 500 sheets of paper. Thereafter, the same set was used to record 6-point Gothic characters. The characters were visually observed, thereby judging whether the ejection stability was lowered by sticking matter caused on an ejection orifice surface of the recording head or not to make evaluation as to sticking suppression. The evaluation criteria of the sticking suppression are as follows.

A: Disorder was not observed on the characters to suppress sticking;
B: Disorder was observed on a part of the characters, but the sticking was slight and at an allowable level;
C: Many disorders were observed on the characters, and sticking was not suppressed.

TABLE 4

Constitution of set and evaluation result

| | | Constitution of set | | | Evaluation criteria | | |
|---|---|---|---|---|---|---|---|
| | Ink No. | Reaction Liquid No. | Molar ratio [times] | Mass ratio [times] | Optical density | Fixability | Sticking suppression |
| Example | 1 | 1 | 1 | 11.9 | 0.24 | A | A | A |
| | 2 | 2 | 1 | 10.2 | 0.23 | A | A | A |
| | 3 | 1 | 2 | 10.2 | 0.24 | A | A | A |
| | 4 | 1 | 3 | 11.9 | 0.15 | A | A | A |
| | 5 | 3 | 4 | 10.6 | 0.15 | A | A | A |
| | 6 | 4 | 5 | 10.7 | 0.22 | A | A | A |
| | 7 | 5 | 1 | 10.6 | 0.22 | A | A | A |
| | 8 | 3 | 1 | 10.6 | 0.26 | A | A | A |
| | 9 | 6 | 1 | 11.9 | 0.24 | A | A | A |
| | 10 | 7 | 1 | 11.9 | 0.24 | A | A | A |
| | 11 | 8 | 3 | 11.9 | 0.15 | A | A | A |
| | 12 | 8 | 1 | 11.9 | 0.24 | A | A | A |
| | 13 | 1 | 6 | 11.9 | 0.24 | A | A | A |
| | 14 | 1 | 7 | 11.9 | 0.24 | A | A | A |
| | 15 | 1 | 8 | 11.9 | 0.24 | A | A | A |
| | 16 | 1 | 9 | 11.9 | 0.24 | A | A | A |
| | 17 | 1 | 10 | 11.9 | 0.24 | A | A | A |
| | 18 | 1 | 11 | 11.9 | 0.24 | A | A | B |
| | 19 | 1 | 12 | 11.9 | 0.24 | A | A | B |
| | 20 | 3 | 13 | 10.6 | 0.26 | A | A | A |
| | 21 | 1 | 14 | 10.2 | 0.24 | A | A | A |
| | 22 | 1 | 15 | 11.0 | 0.24 | A | A | A |
| | 23 | 1 | 16 | 11.3 | 0.24 | A | A | A |
| | 24 | 1 | 17 | 13.1 | 0.24 | B | A | A |
| | 25 | 9 | 1 | 11.9 | 0.24 | A | A | A |
| | 26 | 10 | 1 | 11.9 | 0.24 | A | B | A |
| | 27 | 1 | 18 | 13.1 | 0.24 | B | A | B |
| Comparative Example | 1 | 11 | 1 | 11.9 | 0.24 | A | C | A |
| | 2 | 12 | 1 | — | 0.33 | A | A | C |
| | 3 | 13 | 1 | 11.9 | 0.24 | A | A | C |
| | 4 | 1 | 19 | — | 0.24 | A | A | C |
| | 5 | 1 | 20 | 11.9 | — | A | A | C |
| | 6 | 1 | 21 | 11.9 | 0.24 | A | A | C |
| | 7 | 1 | 22 | 11.9 | 0.24 | A | A | C |
| | 8 | 1 | 23 | 11.9 | 0.24 | A | A | C |
| | 9 | 4 | 1 | 8.9 | 0.22 | C | A | A |
| | 10 | 1 | 24 | 9.0 | 0.24 | C | A | A |
| | 11 | 1 | 4 | 11.9 | 0.14 | A | A | C |
| | 12 | 8 | 4 | 11.9 | 0.14 | A | A | C |
| | 13 | 14 | 13 | 1.2 | 0.10 | C | A | C |
| | 14 | 15 | 25 | 0.7 | 0.10 | B | C | B |
| | 15 | 14 | 25 | 0.7 | 0.10 | C | A | B |

The set of Comparative Example 14 is controlled in such a manner that the speeds of penetration and diffusion of the ink into the recording medium are slowed. In this set, an optical density high to some extent is achieved, and the sticking suppression is also allowable to some extent. However, the fixability is insufficient. Thus, the set of Comparative Example 14 using such Ink 15 was compared with the set of Comparative Example 15 using Ink 14 controlled so as to quicken penetration and diffusion of the ink into the recording medium. As a result, in the set of Comparative Example 15, the fixability was improved to some extent, but the pigment was not sufficiently fixed to the recording medium until the completion of penetration and diffusion of the ink into the recording medium because the reactivity between the ink and the reaction liquid was low, so that the optical density was lowered to an unallowable level. Further, the set of Comparative Example 15 was compared with the set of Comparative Example 13 in which the reaction liquid 25 was changed to the reaction liquid 13 with the polyvalent metal ion changed from $Mg^{2+}$ in the reaction liquid 25 to $Ca^{2+}$ and the content thereof increased aiming at enhancing the reactivity with the ink. Even in this set, the content of the polyvalent metal ion was insufficient to the amount of the acidic group of the water-soluble resin in the ink. As a result, the optical density was insufficient. In addition, the sticking on the ejection orifice surface of the recording head could not be suppressed because the reactivity between the ink and the reaction liquid was somewhat enhanced while the content of the surfactant in the reaction liquid to the total content of the pigment and water-soluble resin in the ink was low.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-093347, filed Apr. 19, 2011 and Japanese Patent Application No. 2012-076527, filed Mar. 29, 2012, which are hereby incorporated by reference herein in their entirety.

What is claimed is:

1. A set of an ink and a reaction liquid for ink jet, the set having a combination of an ink comprising a pigment dispersed by a water-soluble resin, and a reaction liquid containing no coloring material but comprising a polyvalent metal ion and a surfactant, wherein
a surface tension of the ink is 38 mN/m or less,
a content (μmol/g) of the polyvalent metal ion in the reaction liquid is 10.0 times or more in terms of molar ratio as much as an amount (μmol/g) of an acidic group derived from the water-soluble resin in the ink,
the surfactant in the reaction liquid comprises an ethylene oxide adduct of a higher alcohol selected from the group consisting of a linear primary alcohol, a linear secondary alcohol and an isoalkyl alcohol, and has a HLB value of 13.0 or more as determined by the Griffin method, and
a content (% by mass) of the surfactant in the reaction liquid is 0.15 times or more in terms of mass ratio as much as the total content (% by mass) of the pigment and the water-soluble resin in the ink.

2. The set according to claim 1, wherein the polyvalent metal ion is at least one selected from the group consisting of $Ca^{2+}$, $Al^{3+}$ and $Y^{3+}$.

3. The set according to claim 1, wherein a number of carbon atoms of the higher alcohol is 16 or more.

4. An image forming method in which an ink and a reaction liquid are respectively ejected from a recording head of an ink jet system to bring the ink and the reaction liquid into contact with each other on a recording medium, thereby forming an image, wherein the set of the ink and the reaction liquid according to claim 1 is used as the ink and the reaction liquid.

5. The set according to claim 1, wherein a content (% by mass) of the water-soluble resin in the ink is 0.1% by mass or more and 3.0% by mass or less based on the total mass of the ink.

6. The set according to claim 1, wherein a content (% by mass) of the pigment in the ink is 0.1% by mass or more and 15.0% by mass or less based on the total mass of the ink.

7. The set according to claim 1, wherein a content (% by mass) of the surfactant in the reaction liquid is 0.10% by mass or more and 2.5% by mass or less based on the total mass of the reaction liquid.

8. The set according to claim 1, wherein a content (% by mass) of the polyvalent metal ion as a form of a polyvalent metal salt in the reaction liquid is 3.0% by mass or more and 20.0% by mass or less based on the total mass of the reaction liquid.

9. The set according to claim 1, wherein an acid value of the water-soluble resin is 80 mg KOH/g or more and 300 mg KOH/g or less.

* * * * *